F. V. MADALER.
COMBINED PICTURE TAKING AND PHONOGRAPH RECORD MAKING MACHINE.
APPLICATION FILED AUG. 24, 1920.
1,408,621.                    Patented Mar. 7, 1922.
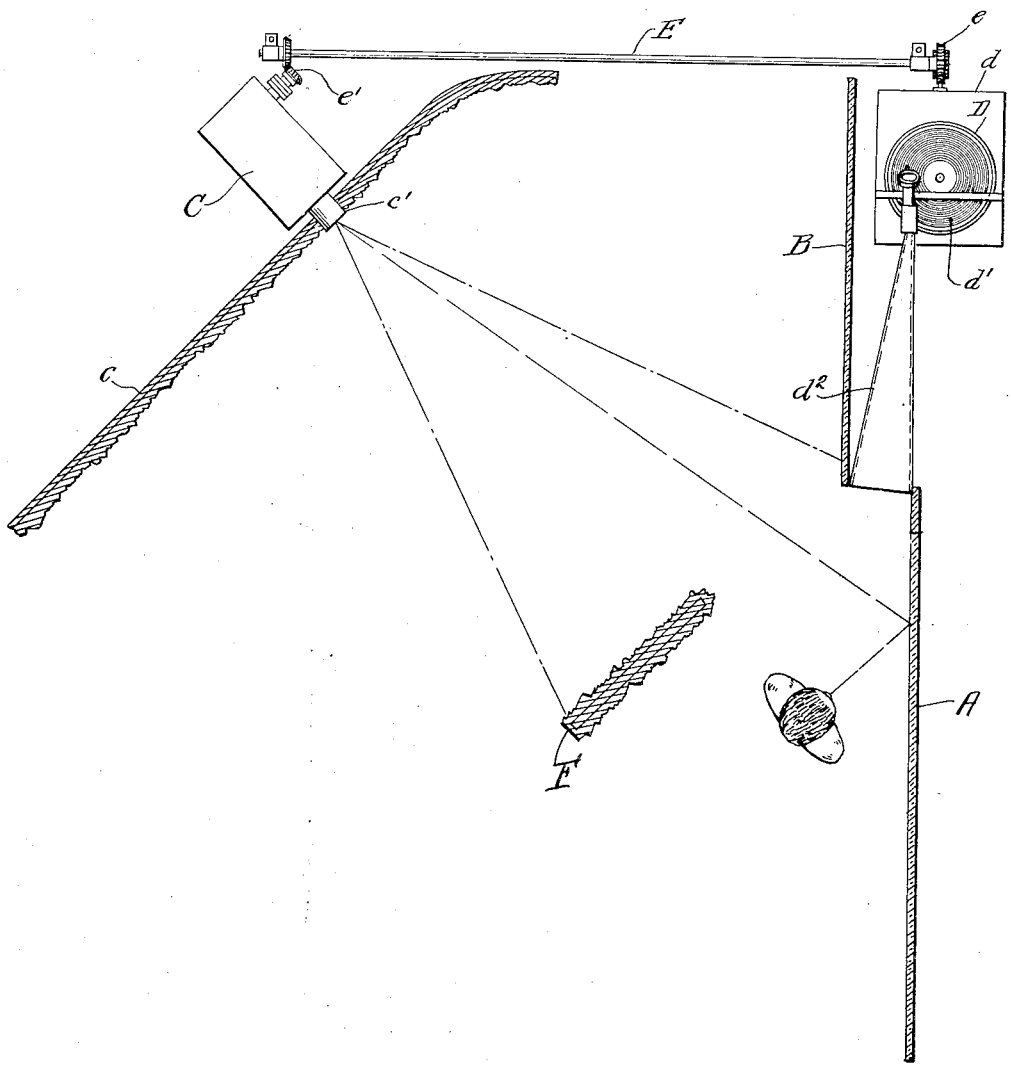
Inventor
Ferdinand V. Madaler
By his Attorney

UNITED STATES PATENT OFFICE.

FERDINAND V. MADALER, OF GOOD GROUND, LONG ISLAND, NEW YORK, ASSIGNOR TO AUDIBLE PICTURES CORPORATION, OF BROOKLYN, NEW YORK, A CORPORATION OF NEW YORK.

COMBINED PICTURE-TAKING AND PHONOGRAPH-RECORD-MAKING MACHINE.

1,408,621. Specification of Letters Patent. Patented Mar. 7, 1922.

Application filed August 24, 1920. Serial No. 405,775.

*To all whom it may concern:*

Be it known that I, FERDINAND V. MADALER, a subject of Austria, residing at Good Ground, Long Island, State of New York, have invented a new and useful Combined Picture-Taking and Phonograph-Record-Making Machine, of which the following is a specification.

This invention is an apparatus embodying means for taking a succession of pictures concurrently with the operation of making a phonographic record of the oral rendition of a song, recitation or other audible production, whereby there are concurrently produced a moving picture film and a phonographic record of a public speaker, an operatic artisté, singer, or other performer, which film and record are adapted to be utilized in a combined projecting and phonograph apparatus of the character disclosed in a separate application filed by me and copending herewith, Serial No. 405,774.

The apparatus embodies a plurality of barriers, one or both of which are or may be mirrors, separated at their adjacent ends to provide a space for the accommodation of a phonograph mechanism, a picture taking mechanism or camera, the field of which includes said barriers, and means such as a stage setting or scenery within the field of said camera and in the rear of which the artist, speaker or performer is adapted to be stationed so that the mirror or mirrors are adapted to reflect the actions of the performer and the stage setting for taking pictures by the camera at the same time that the phonograph mechanism is operative for making a record of the performer's audible effort.

Other functions and advantages of the invention will appear from the following description taken in connection with the drawings, wherein—

The figure is a diagrammatic plan view of an apparatus embodying the invention.

Referring more particularly to the drawing, A, B are a plurality of barriers, one or both of which are or may be provided with reflecting surfaces so as to perform the functions of a mirror. These barriers are positioned as shown, for one to lie somewhat in rear of the other, and in parallel side by side relation, so as to result in a space $a$ between the approximate ends of said barriers. Said space provides for the flow of a vocal rendition of a song, recitation, speech, etc., by a performer stationed in front of mirror A and facing toward the opening $a$ intermediate the mirrors A, B.

Positioned in rear of the barrier or mirror B is a machine for producing a phonograph record, or a matrix of a phonograph record, whereby the barrier or mirror B excludes from the view of a camera C the phonograph matrix mechanism. Said mechanism is shown as embodying a table $d$, whereon is mounted a rotatable carrier D adapted to support and impart motion to a wax matrix $d'$, upon which acts the stylus of a recorder E to which is coupled a horn $d^2$, said horn extending into the space $a$ between the mirrors and with the enlarged open end of said horn facing the performer stationed in front of the mirror A.

The camera C is or may be any of the usual machines used in the art for taking a succession of pictures, said camera being positioned in front of mirror B and so related to the mirrors A B that the field of vision of the lens will take in the two said mirrors without however including the opening or space $a$ between the two said mirrors. As shown, it is preferred to position the camera in the rear of a piece of stage setting $c$ extending at an angle to the mirrors A B, said stage setting having a light opening through which is adapted to project the lens tube $c'$ of the camera.

The operation of the record producing mechanism D is synchronized with the action of the camera, and to this end the mechanisms C D are operatively connected by a cross shaft E, one end portion of which is connected by gears $e$ with the shaft of the record matrix carrier D, whereas the other end of the cross shaft is connected by gears $e'$ with the film feeding mechanism of the picture taking camera.

The performer is adapted to occupy a station in front of mirror A and to face toward the space $a$ so that the voice will carry the words of a song, recitation or speech into the horn $d^2$ of the phonograph record making mechanism. This presents a side or profile view of the performer to the lens tube of the camera, but the apparatus is so arranged that the actions of the performer are free and unhampered for the reason that the camera photographs on the film C' images of the performer, which images are reflected by the mirror A. It is at times desirable to employ a stage setting, such as a piece of stage scenery, at F, positioned between the performer's station and the camera C, as a result of which the succession of pictures in the film C' include the stage setting and the reflected images of the performer while in action.

The operation will be readily understood from the foregoing description taken in connection with the drawings.

Having thus fully described the invention, what I claim as new and desire to secure by Letters Patent is:

1. In an apparatus of the class described, the combination with a plurality of mirrors positioned to produce a space intervening said mirrors, a phonographic record making mechanism occupying such relation to said space so as to record the sound waves flowing through it, and a picture taking mechanism the field of vision of which includes said mirrors.

2. In an apparatus of the class described, the combination with a plurality of mirrors positioned to produce a space intervening said mirrors, a phonographic record making mechanism occupying such relation to said space as to record the sound waves flowing through it, and a picture taking mechanism or camera positioned at an angle to said mirrors so as to exclude from its field of vision the opening intermediate the mirrors.

In testimony whereof I have signed my name this 6th day of August, 1920.

FERDINAND V. MADALER.